(12) United States Patent
Harrison

(10) Patent No.: US 11,882,932 B2
(45) Date of Patent: Jan. 30, 2024

(54) INTERCHANGEABLE BASE STEEL STRUCTURE STORAGE ASSEMBLY

(71) Applicant: Ronald K. Harrison, Ontario (CA)

(72) Inventor: Ronald K. Harrison, Ontario (CA)

(*) Notice: Subject to any disclaimer, the term of this patent is extended or adjusted under 35 U.S.C. 154(b) by 0 days.

(21) Appl. No.: 18/165,097

(22) Filed: Feb. 6, 2023

(65) Prior Publication Data
US 2023/0180929 A1    Jun. 15, 2023

Related U.S. Application Data

(63) Continuation of application No. 17/351,437, filed on Jun. 18, 2021, now Pat. No. 11,690,446, which is a continuation of application No. 16/637,231, filed as application No. PCT/CA2018/050924 on Jul. 30, 2018, now abandoned.

(60) Provisional application No. 62/543,114, filed on Aug. 9, 2017.

(51) Int. Cl.
*B65G 1/02* (2006.01)
*A47B 17/02* (2006.01)
*A47B 47/02* (2006.01)

(52) U.S. Cl.
CPC .......... *A47B 47/021* (2013.01); *A47B 47/028* (2013.01); *B65G 1/02* (2013.01); *B65G 2207/40* (2013.01)

(58) Field of Classification Search
CPC .... B65G 1/02; B65G 2207/40; A47B 47/021; A47B 47/028; A47B 47/027; A47B 96/00; A47B 96/1441
See application file for complete search history.

(56) References Cited

U.S. PATENT DOCUMENTS

| | | |
|---|---|---|
| 3,152,670 A | 10/1964 | Colligan |
| 3,647,080 A | 3/1972 | Denny |
| 5,749,481 A | 5/1998 | Miller |
| 6,332,549 B1 | 12/2001 | MacDonald |
| 6,405,884 B1 | 6/2002 | Dion |
| 7,124,903 B2 | 10/2006 | Gruber et al. |
| 7,249,442 B2 | 7/2007 | Pellegrino et al. |
| 7,311,487 B1 | 12/2007 | Crossley et al. |
| 7,828,161 B2 | 11/2010 | Konstant |
| 8,443,992 B2 | 5/2013 | Lawson et al. |
| 10,974,352 B1 | 4/2021 | Klinger |
| 2002/0020684 A1 | 2/2002 | Gruber et al. |

(Continued)

FOREIGN PATENT DOCUMENTS

| | | | |
|---|---|---|---|
| CA | 2232178 A1 | 1/1999 | |
| CA | 2711891 A1 * | 2/2012 | ........... A47B 47/021 |
| DE | 202010015133 U1 | 1/2011 | |

OTHER PUBLICATIONS

International Search Report and Written Opinion of the International Searching Authority issued in PCT/CA2018/050924, dated Oct. 16, 2018; ISA/CA.

(Continued)

*Primary Examiner* — Kimberley S Wright

(57) ABSTRACT

A storage rack assembly includes a base steel structure which is interchangeably connected to the storage rack above. The base steel structure assembly is compromised of structural material with bolted connections which allow for the replacement or changing of damaged material due to accidental forklift contact all while the above storage system stays in place.

8 Claims, 11 Drawing Sheets

(56) References Cited

U.S. PATENT DOCUMENTS

| | | |
|---|---|---|
| 2004/0079718 A1 | 4/2004 | Gagne et al. |
| 2005/0150853 A1 | 7/2005 | Kimball |
| 2006/0237378 A1 | 10/2006 | Pellegrino et al. |
| 2007/0193190 A1 | 8/2007 | Konstant |
| 2009/0148267 A1 | 6/2009 | Crossley et al. |
| 2009/0277854 A1 | 11/2009 | Eustace et al. |
| 2011/0278251 A1 | 11/2011 | Smith |
| 2021/0252650 A1 | 8/2021 | Klinger |

OTHER PUBLICATIONS

Extended European Search Report regarding EP 18843046.6, dated Mar. 19, 2021.

\* cited by examiner

INTERCHANGEABLE BASE STEEL STRUCTURE STORAGE ASSEMBLY

CROSS-REFERENCE TO RELATED APPLICATIONS

This application is a continuation application of U.S. Continuation patent application Ser. No. 17/351,437, filed Jun. 18, 2021, which is a continuation of U.S. application Ser. No. 16/637,231, filed Feb. 6, 2020, now abandoned, which was a National Stage of International Application No. PCT/CA2018/050924, filed Jul. 30, 2018, which claims priority to U.S. 62/543,114, filed Aug. 9, 2017. The entire disclosures of the above applications are incorporated by reference.

FIELD

The present disclosure relates to the invention is in the art of storage racks for accommodating products and pallets for holding palletized material. The storage racks of the invention have upright columns and beams either structural or roll-form attached to the columns with boltless or bolted connections.

BACKGROUND

This invention relates to storage racks of that type installed in Warehouses/Distribution Centers for the support of palletized material, particularly to those designated storage rack sites which are high volume, high throughput applications.

With the ever-increasing cost per square foot to either lease or build warehouse/distribution space, storage racking systems have been pushed to ever increasing heights to increase storage density while decreasing cost per pallet stored. This trend has been aided by the advancement in material handling equipment (MHE) which now allows for greater loading capacities at ever higher levels. In a further effort to optimize the storage system layout, the material handling equipment's (MHE) working aisles which are required to travel to the desired location to either store or retrieve goods must be reduced to the lowest clearance possible.

As one reduces the clear working aisle for the material handling equipment, the incident rate of MHE contacting and damaging the storage racking system greatly increases. With the industry typically favouring lighter duty roll-form systems (made from sheet steel, for example) over structural systems (made from channel iron, angle iron, tubing, etc.) for economical and ease of use reasons, it has further increased the occurrence of racking damage.

As roll-form columns gain their strength by being rolled into specific shapes and dimensions, any deformation thereof greatly reduces the carrying capacity of said column. Once impacted by MHE they are highly prone to collapse.

Even in the event of slight contact where the front column is slightly damaged, the column (if bolted) must be replaced or possibly the entire upright if of a welded construction.

To replace the damaged column or upright, the loaded pallets either side of the damaged component must be removed from the system and the rack dissembled. After repairs, the pallet must then be reloaded on the structure.

The above process is both an expensive and a time consuming one. The higher the system the greater the number of components that need to be dismantled. Further, this work must be done by a trained professional installer who has the required certifications to operate the MHE and an ever-increasing list of requirements set out by health and safety regulations which differ depending on regions.

It should be noted that it is very rare in these instances for the facility to have replacement components on-site which further exacerbates the time and cost associated with the required system repairs.

For a repair to take place, the individual in charge (IC) of the system must first be notified by the MHE operator that such damaged occurred. Then it must be inspected by a qualified individual to verify that the system or component is still fit for use. If deemed not fit for use then all beam levels must be unloaded of product as previously mentioned above. Then the (IC) must reach out to the manufacturer for a replacement component making sure to specify the exact part required as per the engineering calculation package and installation drawings. A miscommunication during this step can lead to an improper column or upright or brace being ordered and installed which is not capable of handling the required loading conditions thus creating a health and safety concern for all parties working in and around the system. This usually requires a site visit by a manufacturer or dealer representative to verify that the upright requested is correct which further delays the repair process.

Depending on the manufacturer's schedule it may take 2-6 weeks to for the part to be put through purchasing, engineering, scheduling, fabrication and then shipping. During this time, the facility no longer has access to the pallet positions lost due to damage. This can greatly impact their storage capacity, replenishment and pick cycles as well as overall facility efficiencies which many facilities are now being tracked on for overall performance and ultimately employees' bonuses.

With the first step being the most critical for a safe working environment, the reporting of incidents where racking damage occurs, it usually goes unreported as it will have a negative impact on the quantitative benchmarks of the facility.

The (IC) typically waits for several damages to occur within the racking system prior to ordering in replacement components. Good operators will lock out their damaged locations within their warehouse management system (WMS) as well as physically empty all pallets within the damaged material zone and further tape off said locations. This unfortunately is not the norm and damage is only reported or discovered in an annual safety audit thus an unsafe working environment can be allowed to continue for as long as the incident goes unreported or undiscovered.

Although damage can occur in any part of the racking system, it is common knowledge that most of all damage to the system occurs from the floor to the top of the first load beam in any given bay. This damage mostly occurs due to operator error when piloting the MHE (forklift) while interfacing with the racking system. The combined weight of the MHE, onboard battery and pallet load creates a very convincing battering ram.

In a very high percentage of cases the front column and internal bracing panels take most of the impacts from the MHE. These components located at the bottom of the upright are the most critical with regards to the structural integrity of the system. As all upper loads are being supported by these critical components any damage to the bottom of the upright creates a situation where they are highly susceptible to failure and ultimately collapse.

The pallet racking industry has come up with various measures to limit the damage at the lower portion of the system however many if not all fail to address the real needs of the facility from an economical, safety and downtime perspective.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The present invention provides a means in which to replace damaged components of the most critical part of the structure all while the above storage system stays in place. This design provides the following distinct advantages over prior art.

The base steel structure assembly is manufactured as an entirely separate piece from the above storage rack itself however the above loading conditions are factored into the engineering and design of the base assembly. As the base steel structure assembly would be required to take more abuse than the above rack system it would be manufactured from heavy structural members thus allowing for a more economical lighter gauge material to be used for the rack system above.

It should be noted that the base steel structure assemblies' material and dimensions will change to suit engineering and system requirements.

The base is designed with front and rear columns with holes punched on the face of the material to allow for bolted connections. The front and rear columns would have welded tabs which are provided with holes to accept hardware and the holes are located at various heights within the web as dictated by engineering. The welded tabs allow for the bracing panels to be bolted to the front and rear columns as well as the horizontal channels located at the lower end of the base. The bracing panels can be of ("K", "X", or "Z") configuration or as per engineering requirements.

Further, the base steel structure assembly is designed such that the front and rear column support a horizontal member at the top of the assembly to which the above storage rack upright would be affixed to. The horizontal member and all subsequent bracing panels would be bolted to the front and rear column to allow for the damaged components to be replaced in the event of accidental MHE contact.

Upon damage either being discovered or reported, the MHE operator would simply unload palletized material from all beams levels either side of the damaged base steel structure assembly and proceed with the repair as follows.

In the event of a damaged bracing panel, the trained individual would simply unfasten two bolts at either end of the damaged structural member, remove the damaged component, install the new component, and then fasten the new hardware as required. The estimated time to replace a damaged component is about 10 minutes.

If the front column is damaged, the trained individual would unfasten and remove all internal bracing components allowing for the placement of a load jack under the top horizontal member which in turn would support the above load. This would allow pressure to be released from the bolted connections and the removal of the hardware from the damaged column. The front column would simply be removed allowing for the installation of the new front column. All bolted connections would be installed with new hardware and fastened as required. The estimated time to replace a damaged component is about 45 minutes.

As an added safety feature a solid connection is made between the load jack and the horizontal member via a hole punched or otherwise formed in the member that accepts a bolt fixed to the load jack that can then be held in place with a nut.

When designing a racking system with this base steel structure assembly, it would be prudent to have the first load beam level be made of structural material (as opposed to roll-form) as it receives a great deal of impact from MHE as well.

Preferably, the front and rear base columns as well as the top horizontal member should terminate above the first load beam as the load beam connection will add further rigidity to the system. This design configuration further benefits the above racking system as it elevates the weakest link in the chain out of the MHE impact zone.

As demonstrated this invention saves valuable time and costs associated with repairing the most critical part of the racking system as well as drastically increases the overall durability, longevity and safety of the system.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
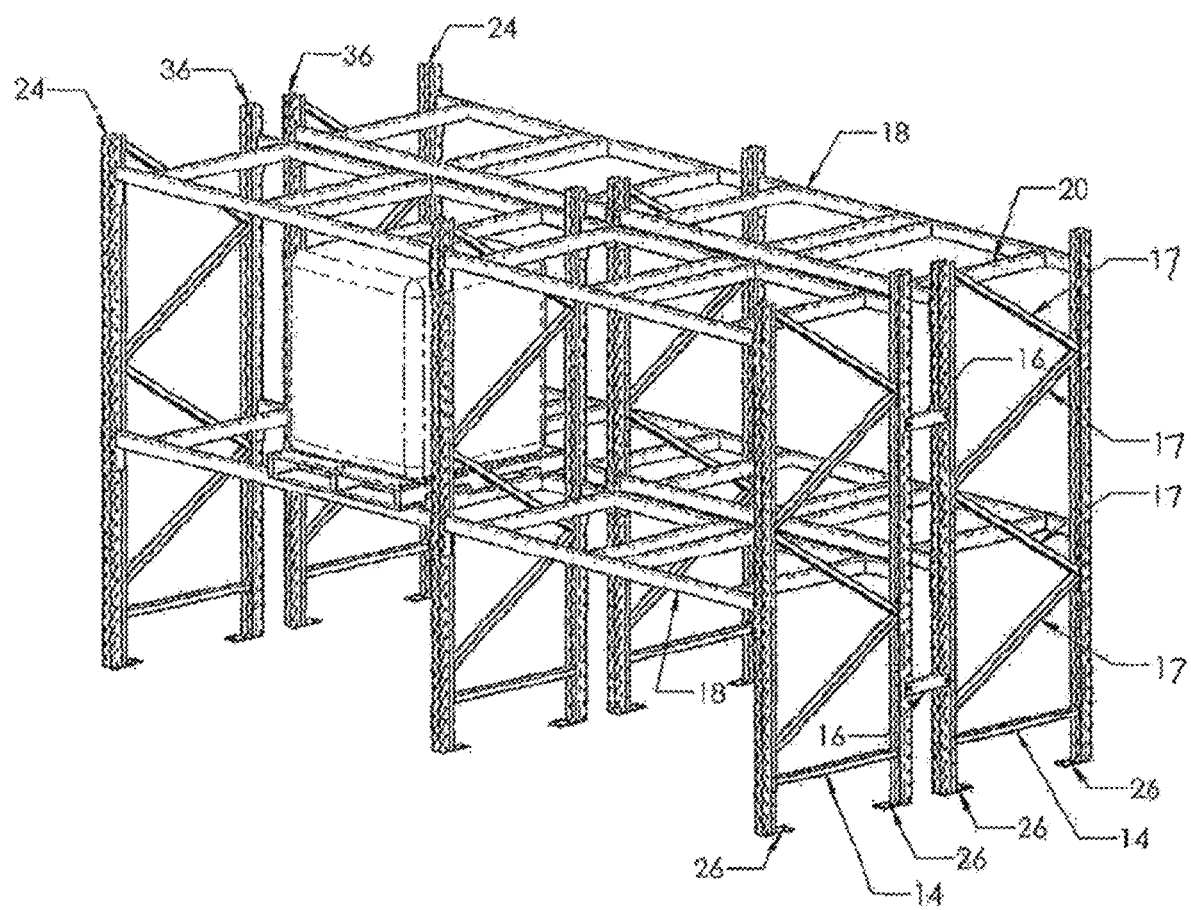
FIG. 1 is a side perspective view of a prior art storage rack.

FIG. 1 shows an example of a prior art storage rack that may be retrofitted to make a rack in accordance with the present invention. A preferred embodiment of the present invention is shown in FIGS. 2-11.

The rack of FIG. 1 has a multitude of forward columns 24, and a multitude of rear columns 36, and horizontal load beams 18 interconnecting the forward and rear columns 24, 36 to form levels to support palletized material. Each pair of forward and rear columns 24, 36 extends from a baseplate 26 and also includes horizontal forward-to-rear braces 14 and diagonal forward-to-rear braces 17. In this configuration, the back to back columns 36 have row spacers 16 that control the flue dimension. This rack is prone to damage from material handling equipment (MHE) when the operator is interfacing with the racking system. It is then very problematic and costly to repair the damage uprights as discussed above.

Figure 2:
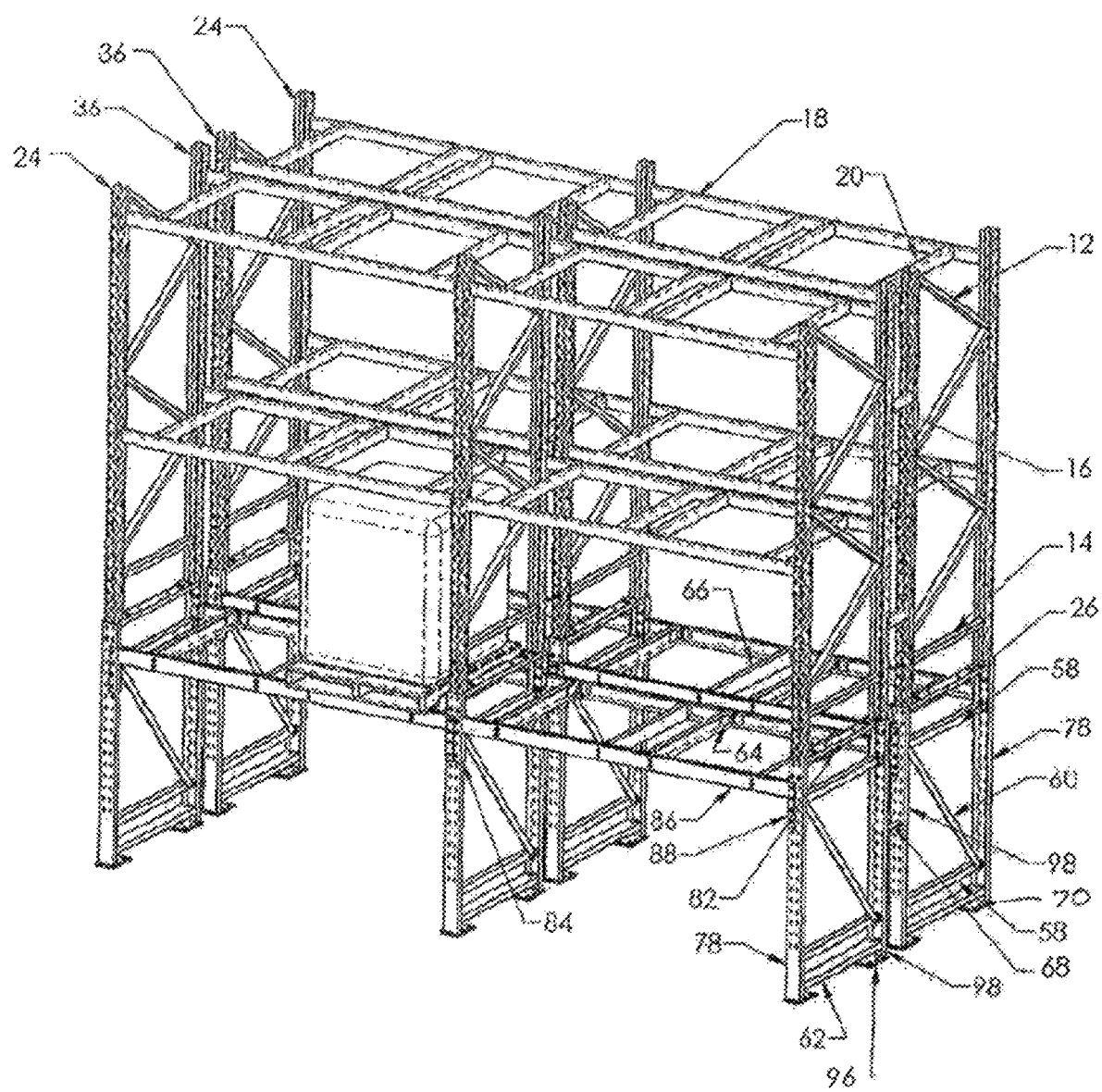
FIG. 2 is a side perspective view of a first embodiment of a storage system made in accordance with the present invention.

FIG. 2 shows a storage rack with a base steel structure assembly made up of structural components to greatly reduce the damage due to impact by the MHE. The upper portion of the front columns terminate above the first load beam level as the load beam connection adds additional durability and rigidity to the base steel structure assembly. This rack may be made in this form initially, or it may be made by retrofitting the prior art rack of FIG. 1. This rack also has a front column 78, rear column 98, horizontal load beams 86 and horizontal pallet supports 66. The columns are supported by bolted horizontal forward-to-rear braces 58 and bolted diagonal forward-to-rear braces 60. The pallet supports interconnect via an angle bracket 64 to the front and rear horizontal load beams 86. A horizontal member 82 is bolted connected to the top of the front column 78 and the rear column 98. This horizontal member has an identical hole punch pattern on the front face of the material which corresponds to the baseplates' 26 hole pattern, this allows for a bolted connection between the upper and lower columns. Once fully assembled, the entire assembly is then anchored to an underlying floor via holes extending through baseplates 70 attached to the front columns 78 and baseplates 96 attached to the rear columns 98.

Figure 3:
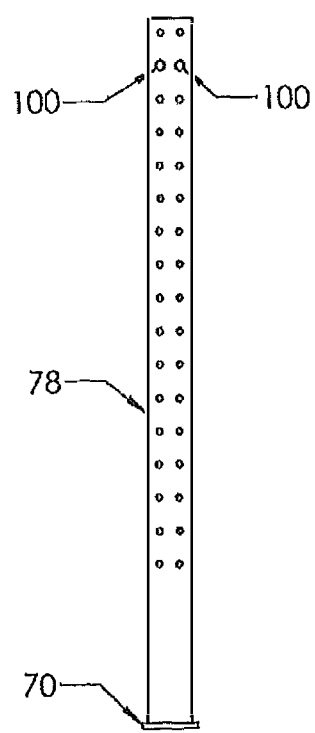
FIG. 3 is a front view of a base portion of the storage system of FIG. 2.

FIG. 3 shows front column 78 with corresponding baseplate 70. The front column is punched with round holes to accept bolted connections as required.

Figure 4:
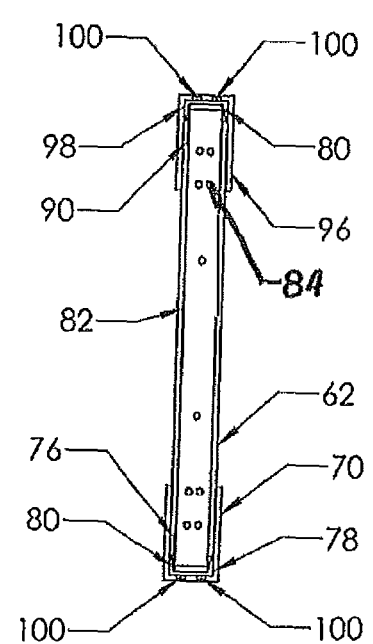
FIG. 4 is a top view of the base portion of the storage system in FIG. 2.

FIG. 4 shows a top view of the horizontal member 82 with corresponding front column 78 and rear column 98. The horizontal member would have holes 84, punched or otherwise formed on the front face of the material which correspond to the holes in the baseplate 26 in FIG. 2 to allow for a bolted connection. The front baseplate 70 and rear baseplate 96 which allow for the assembly to be anchored to the floor are also illustrated. A plate 80 is welded to each end of the horizontal structural member 82 which allows for a bolted connection between the front column 78 and the rear column 98.

Figure 5:
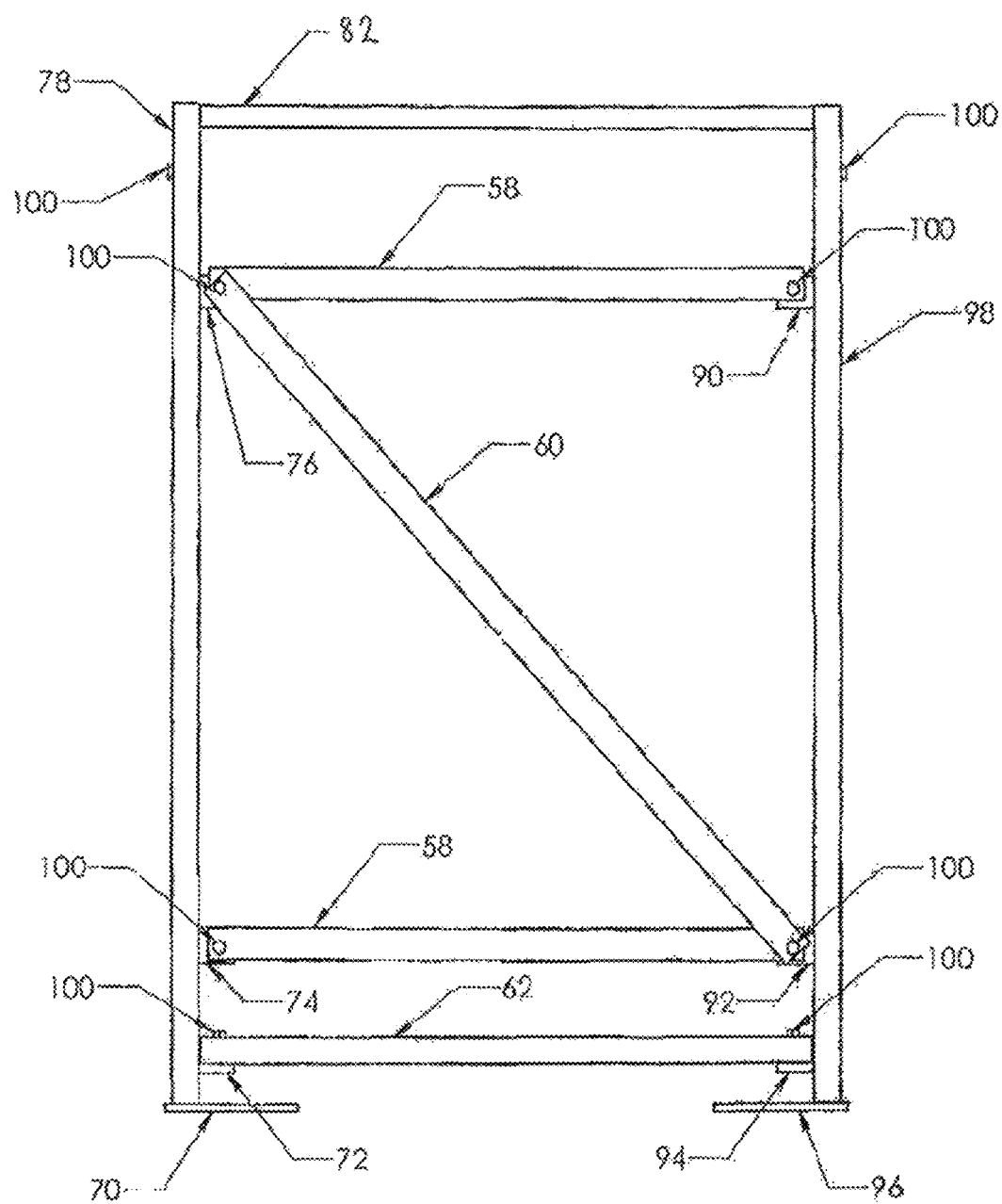
FIG. 5 is a side view of the base portion of the storage system in FIG. 2.

FIG. 5 shows the base steel structure assembly fully assembled and prior to being connected to the above storage system. Bolted connections 100 allow for quick and easy replacement of damaged components all while the above storage system stays in place. The front column 78 and rear column 98 are typically rectangular or C-shaped structural members. The columns are supported by horizontal forward-to-rear braces 58 and diagonal forward-to-rear braces 60. The braces are bolted to tabs 74 and 76 on the front column and tabs 90 and 92 on the rear column. Before being welded to the columns the tabs are provided with holes through punching or otherwise to accept a bolted connection which allows for easy replacement of braces if ever damaged. The horizontal member 82 which is positioned at the top of the assembly is bolted to the front column 78 and rear column 98. This horizontal member allows for the columns in the above storage rack to remain in place during the replacement of any damaged structural component as it supports the load from both columns and is connected by bolts through said columns baseplates 26 in FIG. 1. A vertical load jack 200 (FIGS. 9 and 11) may be installed under the horizontal member to take the above load while the required repairs are being completed. The horizontal channel 62 which is bolted to tabs 72 and 94 acts as a guard rail to further protect the critical bracing panel above from damage. This structural channel is considered a sacrificial component and is generally not considered in the engineering of the base steel structure assembly. Once assembled to the storage rack above, the entire assembly is anchored to the floor via the front and rear baseplates 70 and 96.

Figure 6:
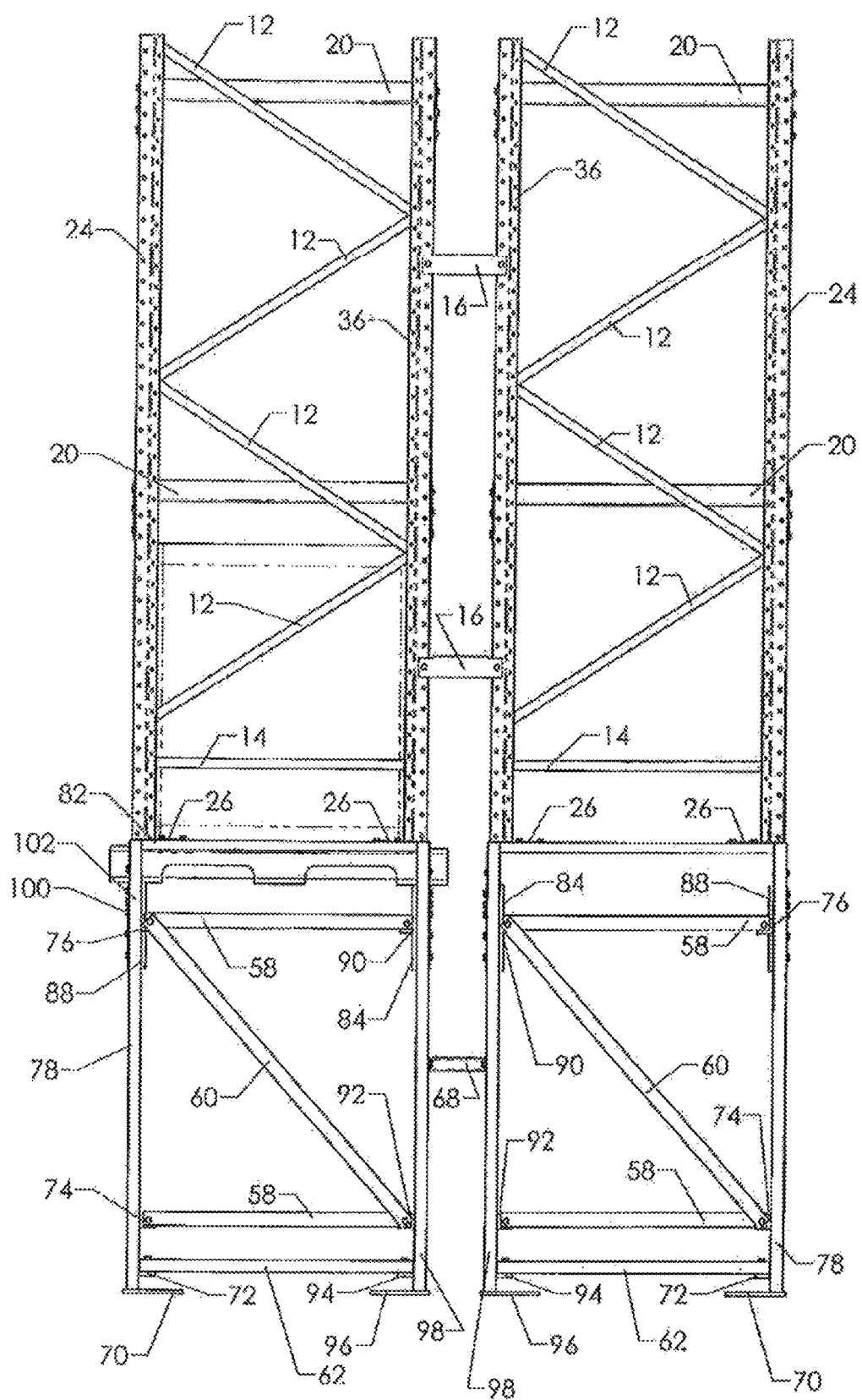
FIG. 6 is a side view of the storage system of FIG. 2.
Figure 7:
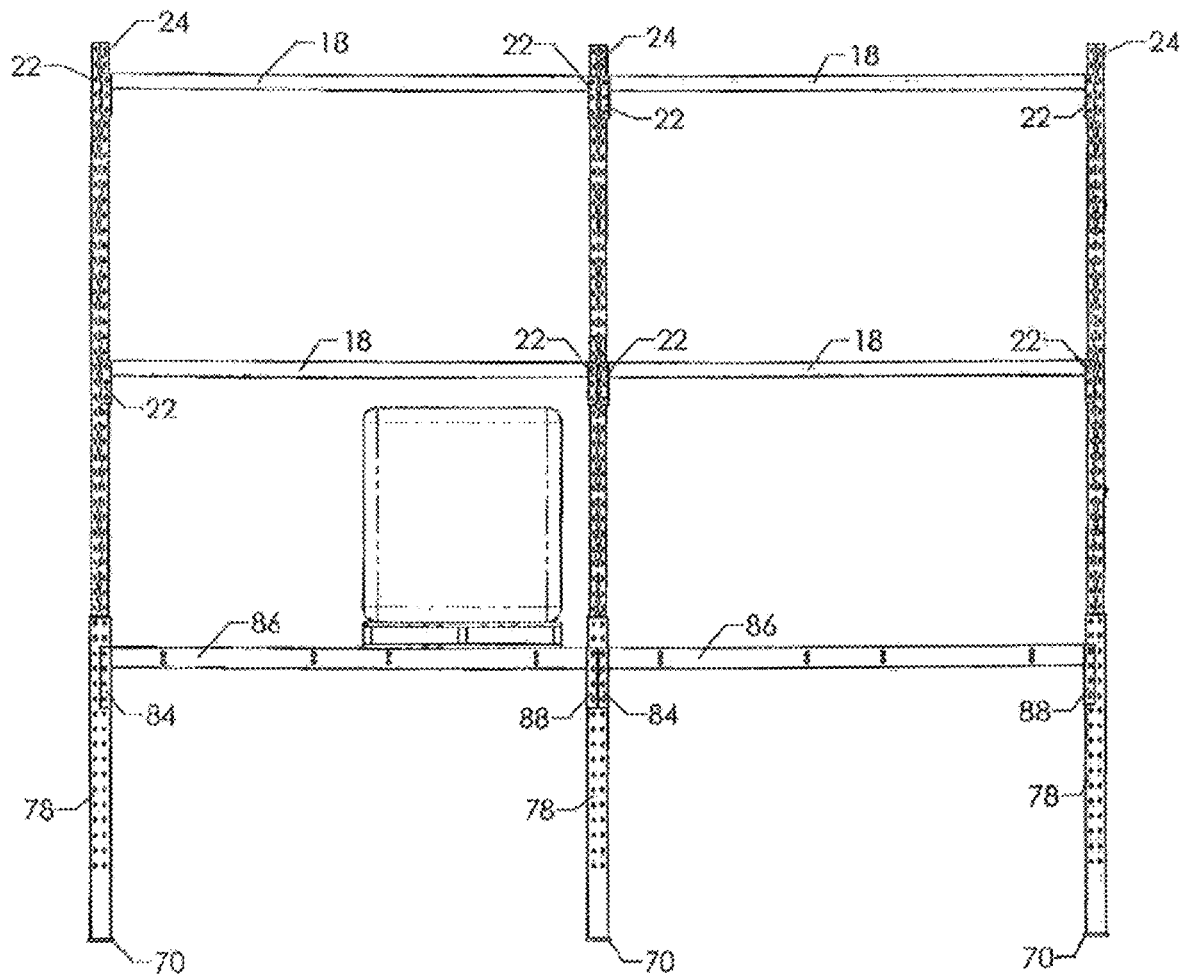
FIG. 7 is a front view of the storage system of FIG. 2.

FIGS. 6 and 7 shows the base steel structure assembly connected to the above storage rack assembly as per the present invention. The front column 78 should terminate above the first load beam 86 as any lower and the lighter column material 24 in the above storage rack would be exposed to damage as it would more than likely fail before the structural material below. The structural bolted angle connectors 84 and 88 which are positioned on either end of the load beam 86, add further rigidity and durability to the base assembly and greatly restricts the transfer of forces from the MHE further up the column 78. This design configuration keeps the damage below the top horizontal member 82 in FIG. 5 thus allowing damage components to be replaced without the dismantling of the above storage rack.

Figure 8:
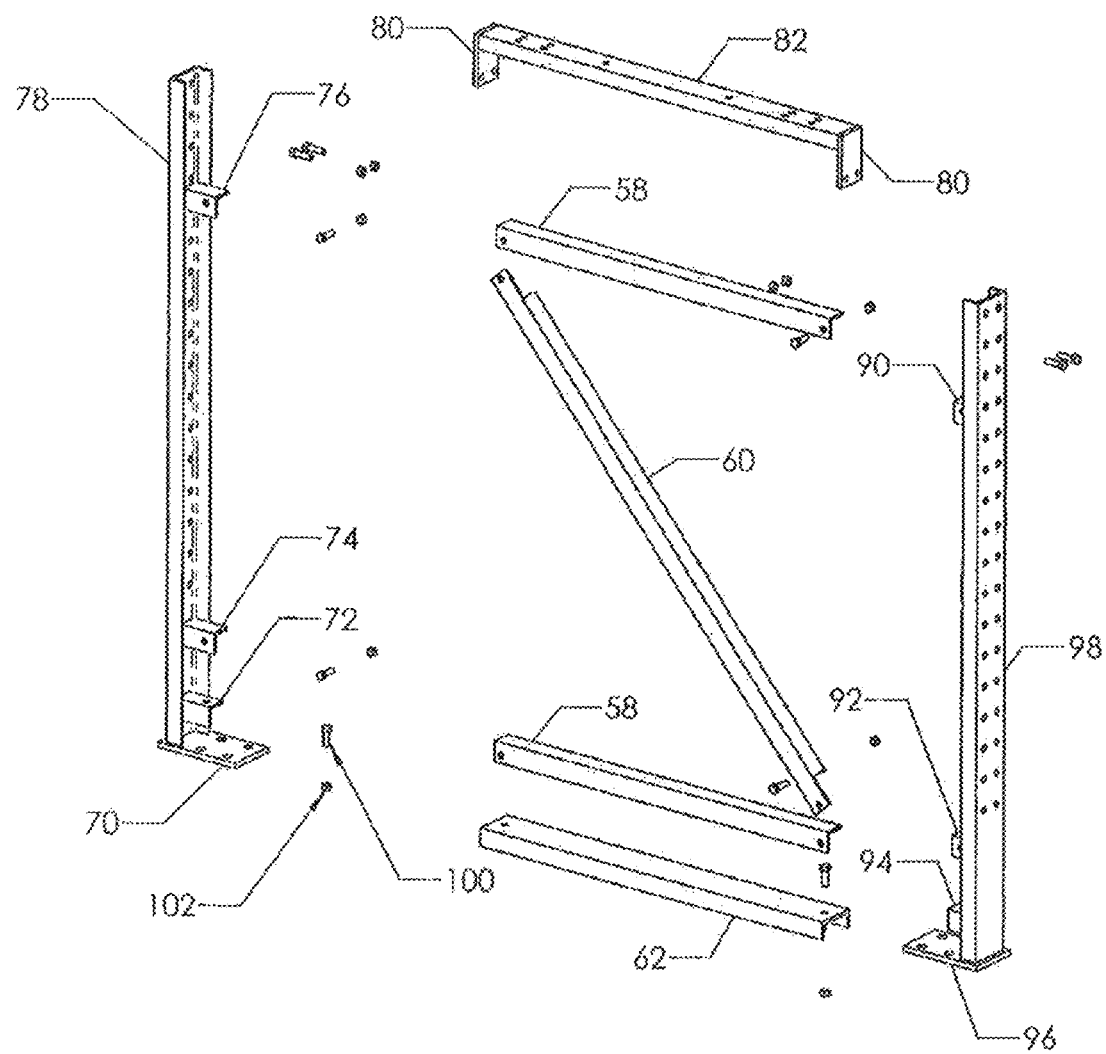
FIG. 8 is a side perspective view of a dismantled base.

FIG. 8 shows the base steel structure assembly completely dismantled or prior to assembly as well as all the locations of the bolt 100 and nut 102 connections. This further shows the ease in which the front column or braces can be replaced in the event of damaged caused by the MHE. This view of the front column 78 further details the tabs 72, 74 and 76 which may be punched and welded to the web of the column. The plates 80 on either end of the top horizontal channel 82 may be punched and welded to allow for a bolted connection with the front column 78 and rear column 98. Having the plates 80 welded to the horizontal member 82 allows for the front column 78 to pull away without restriction from the assembly when being replaced due to damage. Having the lower horizontal members 58 and 62 bolted to the front column 78 and rear column 98 allows for them to be installed after the anchoring of the assembly has been completed. This allows for proper alignment of the anchoring hardware as these members 58 and 62 do not impede the vertical alignment of the drilling process.

Figure 9:
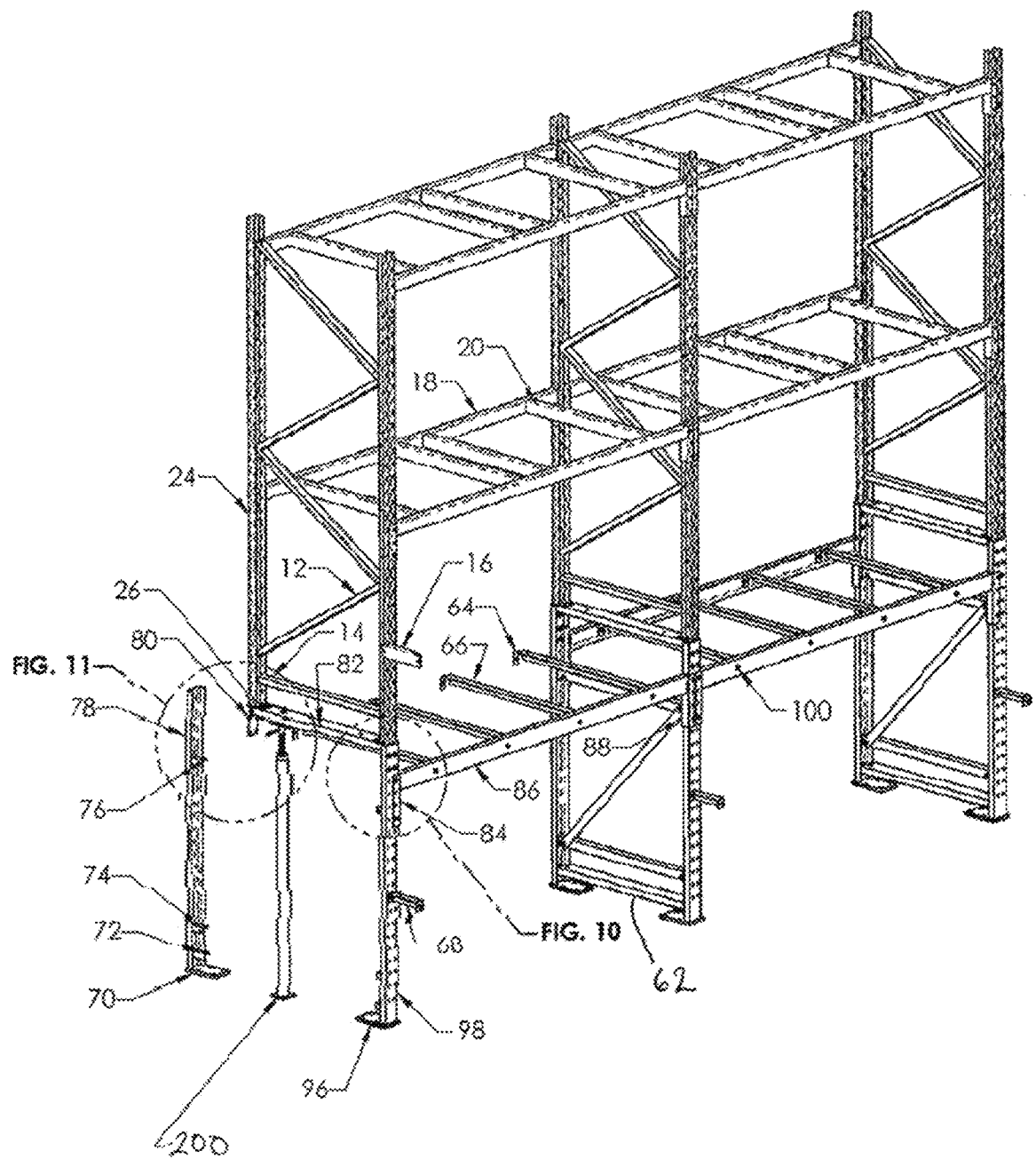
FIG. 9 is a side perspective view of the base being repaired while being supported by the load jack.

FIG. 9 shows the base steel structure assembly's front column 78 under repair. In the event of damage to either the front column 78, rear column 98, diagonal brace 60 or horizontal braces 58, the vertical load jack 200 is installed under the top horizontal member 82 and fastened in place via a nut on the fixed bolt of the jack. The horizontal member 82 has pre-punched hole locations at either end of the member (FIG. 11) to allow for the bolt from the vertical load jack to be positioned into as an added safety feature. The vertical load jack would then be ratcheted up to pick up the load from the above storage rack and release the shear load on the bolted connections of the base steel structure assembly below. Upon removal of all bolted connections 100, the damaged component would be simply removed and a new component would be installed with new hardware. The vertical load jack would then be unbolted from the horizontal member 82 returning the above load to the base assembly below.

Figure 10:
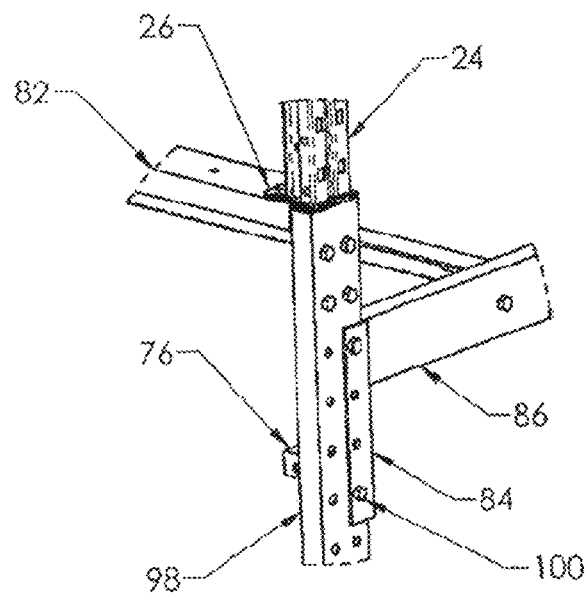
FIG. 10 is an enlarged perspective view of the encircled area 10 in FIG. 9 of the base and above upright connection.

FIG. 10 shows a detail view of the load beam 86 being bolted with bolts 100 through the beam connector 84 to the rear column 98. The above storage rack rear column 24 is bolted via the rear columns baseplate 26 to the base assemblies' top horizontal member 82. In the event of a repair to the base steel structure assembly, the top horizontal member 82 remains fixed to the above storage rack.

Figure 11:
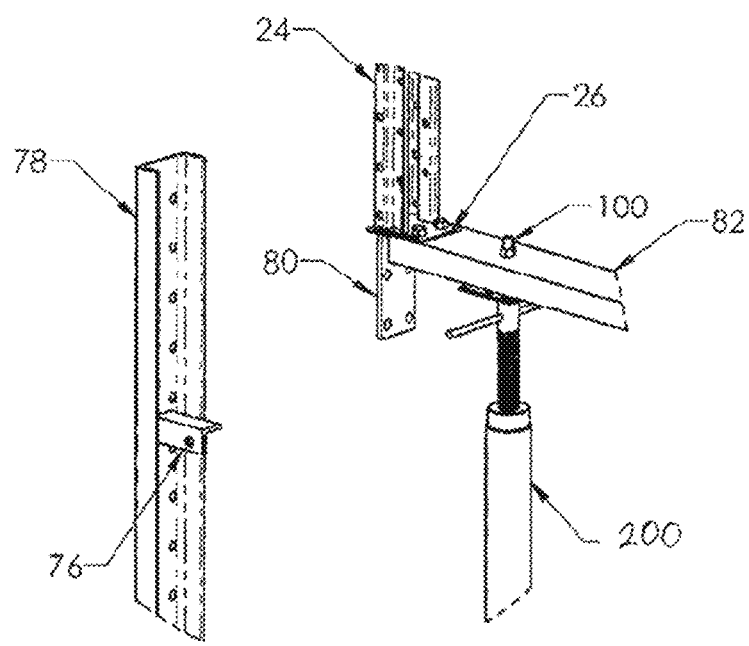
FIG. 11 is an enlarged perspective view of the encircled area 11 in FIG. 9 showing the base and above upright connections as well as a portion of the sub assemblies while under repair.

FIG. 11 shows a detail view of the front column 78 of the base assembly being repaired. The vertical load jack is positioned with the bolt 100 through the top horizontal member 82 for the duration of the repair. The position of the top horizontal member plate 80 is instrumental in allowing the front column 78 to be removed without restriction upon the removal of all hardware. The punched and welded tab 76 has been released from the horizontal brace 58 and diagonal brace 60 by a single bolt connection. The front column 24 and subsequent baseplate 26 remain bolted to the top horizontal member 82 for the duration of the repair thus simplifying the entire process and greatly reducing the high cost associated with a complete dismantle.

Figure 12:
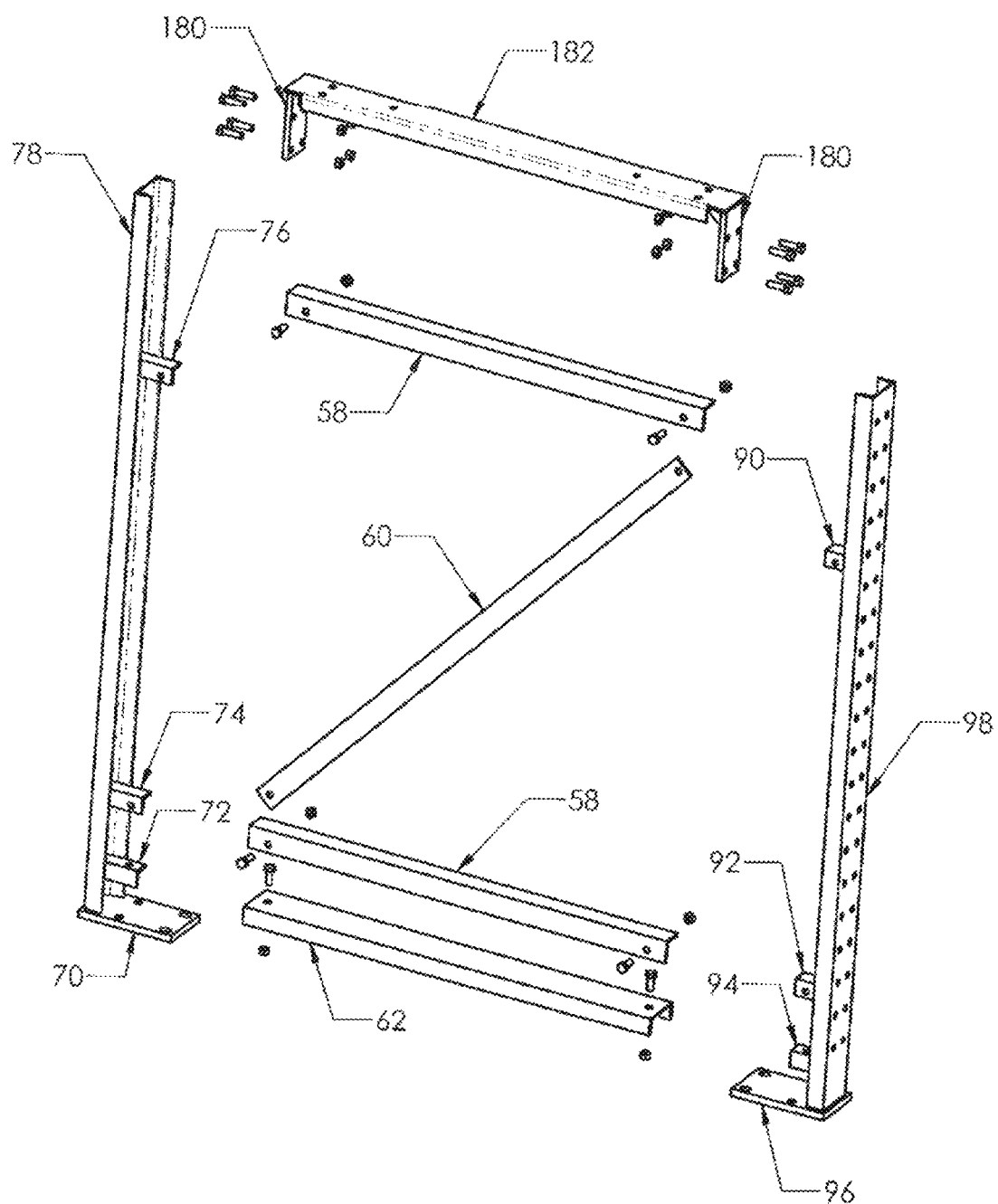
FIG. 12 is a side perspective view of the dismantled base of an alternate embodiment of the storage system.

FIG. 12 shows the base assembly completely dismantled or prior to assembly with enhancements to the plates 180 and the top horizontal member 182 as compared to prior embodiments 80 and 82. All else remains the same. By changing the structural material of 182 from channel to (formed and notched) plate, it allows for a wider more stable platform for the upper column 24 and subsequent baseplate 26 to sit on. The wider platform also allows for the acceptance of various baseplate 26 dimensions and anchor locations. The prior narrower embodiment 82 would have required manufacturers to modify their baseplates to suit causing reduced market acceptance and additional costs. Further, the plates 180 which are now welded to the underside of 182 have been slightly recessed from either end of the top horizontal member thus allowing the plate material to extend to the front face of the front column 78 and rear column 98. This enhancement guarantees that the top horizontal member 182 always sits above the front column 78 and the rear column 98. Prior embodiments may have allowed for the top horizontal member 82 to rest below the front column 78 and rear column 98 creating unwanted stress on the above baseplates 26.

Figure 13:
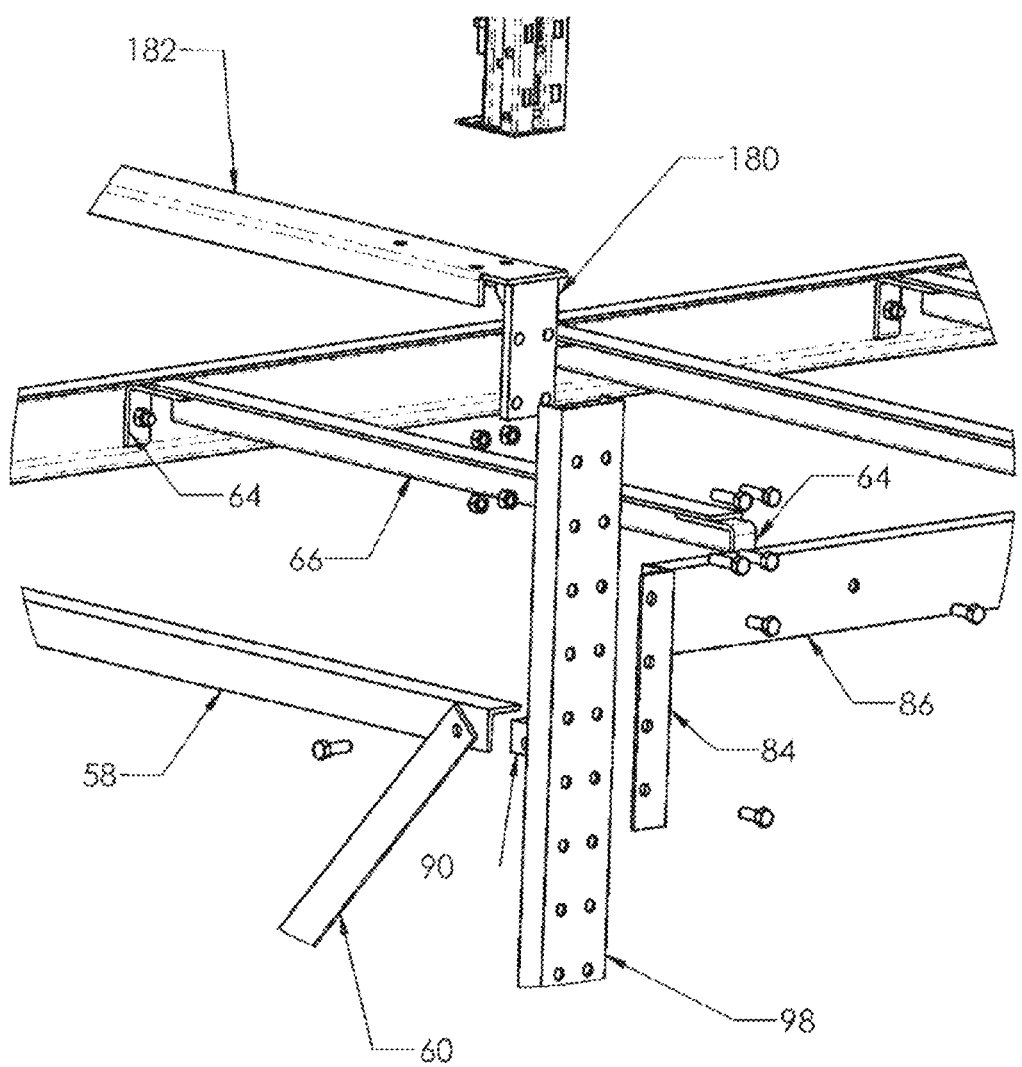
FIG. 13 is an exploded side perspective view of the upper right portion of the base showing an enhanced connection detail.

FIG. 13 shows the base assemblies in an exploded view for the rear column 98, the enhanced top horizontal member 182, the repositioned plate 180 as well as the horizontal brace 58 and diagonal brace 60. The explanation for enhancements to both 180 and 180 are explained in FIG. 12.

What is claimed is:

1. A base steel structure assembly for supporting an overlying racking system, said racking system having upright columns which support horizontal beams extending therebetween and connected thereto, said base steel structure assembly comprising:
a front column extending from a front baseplate;
a rear column generally parallel to said front column and extending from a rear baseplate;
an upper horizontal member extending between an upper end of said front and rear columns and releasably secured thereto;
a lower horizontal member extending between a lower end of said front and rear columns and releasably secured thereto;
at least one brace extending diagonally between said front and rear columns and releasably secured thereto;
said upper horizontal member being securable to said upright columns of said overlying racking system for supporting said overlying racking system; and
said front and rear columns being provided with holes therethrough for securement of a support beam respectively to front and rear columns of an adjacent of said base steel structure assembly;
wherein said support beam being is receivable below upper portions of the front columns; and
wherein each of the components of the base steel structure is replaceable.

2. A base steel structure assembly as claimed in claim 1 wherein said upright columns extend upwardly from respective baseplates:
said respective baseplates have holes extending therethrough; and
said upper horizontal member is provided with holes therethrough which register with the holes in the respective baseplates of the upright columns for bolting of the respective baseplates to the upper horizontal member.

3. A base steel structure assembly as claimed in claim 2 wherein said upper horizontal member are releasably secured to said front and rear columns with nuts and bolts.

4. A base steel structure assembly as claimed in claim 2 having a lower horizontal channel bolted between said front and rear columns beneath said lower horizontal member to act as a guardrail to protect said at least one brace.

5. A base steel structure assembly as claimed in claim 2 having a lower horizontal channel bolted between said front and rear columns beneath said lower horizontal member.

6. A base steel structure assembly as claimed in claim 1 wherein said upper horizontal member is releasably secured to said front and rear columns with nuts and bolts.

7. A base steel structure assembly as claimed in claim 6 having a lower horizontal channel bolted between said front and rear columns beneath said lower horizontal member.

8. A base steel structure assembly as claimed in claim 1 having a lower horizontal channel bolted between said front and rear columns beneath said lower horizontal member to act as a guardrail to protect said at least one brace.

* * * * *